US012598190B2

(12) United States Patent
Wang

(10) Patent No.: US 12,598,190 B2
(45) Date of Patent: Apr. 7, 2026

(54) UNIFIED SECURE ACCESS CONTROL TO SOFTWARE SERVICES AND APPLICATIONS

(71) Applicant: Yanlin Wang, Cupertino, CA (US)

(72) Inventor: Yanlin Wang, Cupertino, CA (US)

(73) Assignee: Splashtop Inc, Cupertino, CA (US)

( * ) Notice: Subject to any disclaimer, the term of this patent is extended or adjusted under 35 U.S.C. 154(b) by 75 days.

(21) Appl. No.: 18/430,649

(22) Filed: Feb. 2, 2024

(65) Prior Publication Data

US 2025/0254171 A1     Aug. 7, 2025

(51) Int. Cl.
H04L 9/40 (2022.01)

(52) U.S. Cl.
CPC ............ H04L 63/102 (2013.01); H04L 63/20 (2013.01)

(58) Field of Classification Search
CPC ....... G06F 21/31; G06F 21/34; H04L 63/102; H04L 63/20
USPC ..................................... 726/7; 709/225, 229
See application file for complete search history.

(56) References Cited

U.S. PATENT DOCUMENTS

| 8,607,306 | B1 * | 12/2013 | Bridge | .................... | H04L 67/02 726/1 |
| 10,824,696 | B1 * | 11/2020 | Jakobsson | ............... | G06F 21/10 |
| 11,556,617 | B2 * | 1/2023 | Jakobsson | ............... | G06F 21/32 |
| 2009/0083726 | A1 * | 3/2009 | Amend | ................... | H04L 67/02 717/171 |
| 2022/0014503 | A1 * | 1/2022 | Boutros | ............. | G06F 21/6218 |
| 2022/0158990 | A1 * | 5/2022 | Gujarathi | ............ | H04L 63/0823 |
| 2023/0275875 | A1 * | 8/2023 | Samayavel | ......... | H04L 63/0281 726/12 |
| 2024/0028503 | A1 * | 1/2024 | Gurnasinghani | ....... | G06F 11/36 |

* cited by examiner

*Primary Examiner* — Liang A Wang

(74) *Attorney, Agent, or Firm* — Wei Wu, Reg. No. 71088

(57) ABSTRACT

Methods and systems of access control to enterprise applications. Embodiments of the invention implement a unified secure access control solution to enable users to securely authenticate with applications no matter whether they are hosted in SAAS cloud or private networks. Intelligence Edge Gateways deployed at a network edge close to users' geographical locations ensure the control of users' secure access to software services and applications with minimized latency. A user only needs one set of credentials to gain access to various applications hosted in SAAS cloud or private networks. In an embodiment, Intelligence Edge Gateways enables IT administrators to set data plane level security policies in addition to the identity and access management policies. IT administrators are able to configure and manage all the security policies at Unified Access Cloud in a centralized manner.

10 Claims, 3 Drawing Sheets

UNIFIED SECURE ACCESS CONTROL TO SOFTWARE SERVICES AND APPLICATIONS

FIELD OF THE DISCLOSURE

This disclosure relates generally to Internet security and, more particularly, to methods and systems of unified secure access control to software services and applications hosted in SAAS (Software As A Services) cloud or hosted in private networks.

BACKGROUND

The number of software services and applications available via SAAS cloud has grown in recent years due to the wide availability of cloud computing infrastructure and services such as Amazon Web Services (AWS), Microsoft Office 365, and Salesforce.

An enterprise may provide access to users to a number of applications for various purposes such as product development, business analytics, and human resources management, and so on. Nowadays it is typical that some of these applications are hosted by the enterprise on its private networks, while other applications are hosted by application providers via SAAS cloud infrastructure and services.

These disparately hosted applications provide challenges as these disparate systems may not share passwords and authentication systems. IT administrators have to provision separate access control configurations and policies for identity and access management. This increases the IT administration expense and management of passwords and authentication to these different systems.

Single Sign-On (SSO) solutions mitigate the issue by enabling users to securely authenticate with multiple applications by using just one set of credentials. However, this requires a trust relationship established between Identity Provider and an identity provider such as OneLogin and Google Sign-in. And many of the enterprise applications may not have integration with SSO solutions. Therefore, a user has to sign up for individual accounts to use such enterprise applications that do not support SSO.

In addition to the identity and access management for authenticating a user with certain applications, an enterprise may set additional security configuration and policies such as Identity Provider (IdP) integration, firewall/VPN policies and Cloud Access Security Broker (CASB) policies to control the user's access to these applications. For example, a security policy could be that a user is allowed to use certain applications only during weekdays via his/her assigned terminal. Such access control requires not only another set of security management and configuration systems but also data plane level security access control. As a result, this further increases the IT administration expense and management complexity.

SUMMARY OF THE INVENTION

Embodiments of the invention implement a unified secure access management solution to enable users to securely authenticate and authorize applications no matter whether they are hosted in SAAS cloud or private networks.

Embodiments of the invention implement a unified secure access management solution that provides secure network relay to access the private applications hosted in private networks.

In an embodiment, IT administrators are able to configure and manage all the employee enablement configurations at a Unified Access Cloud in a centralized manner. The employee enablement configurations include but are not limited to network and security policies, access control policies, endpoint security posture policies, endpoint configuration as well as identity broker configurations.

In an embodiment, Intelligence Edge Gateways deployed at a network edge close to users' geographical locations ensure the control of users' secure access to software services and applications with minimized latency, helping improve the user experience. A user only needs one set of credentials to gain access to various applications hosted in SAAS cloud and/or private networks. Intelligence Edge Gateways enforces the data plane level network and security policies in addition to the identity and access management policies.

BRIEF DESCRIPTION OF DRAWINGS

Embodiments of the invention are illustrated by way of example and not by way of limitation in the figures of the accompanying drawings in which references indicate similar elements. Note that references to "an" or "one" embodiment in this disclosure are not necessarily to the same embodiment, and such references mean "at least one."

DETAILED DESCRIPTION OF THE INVENTION

Figure 1:
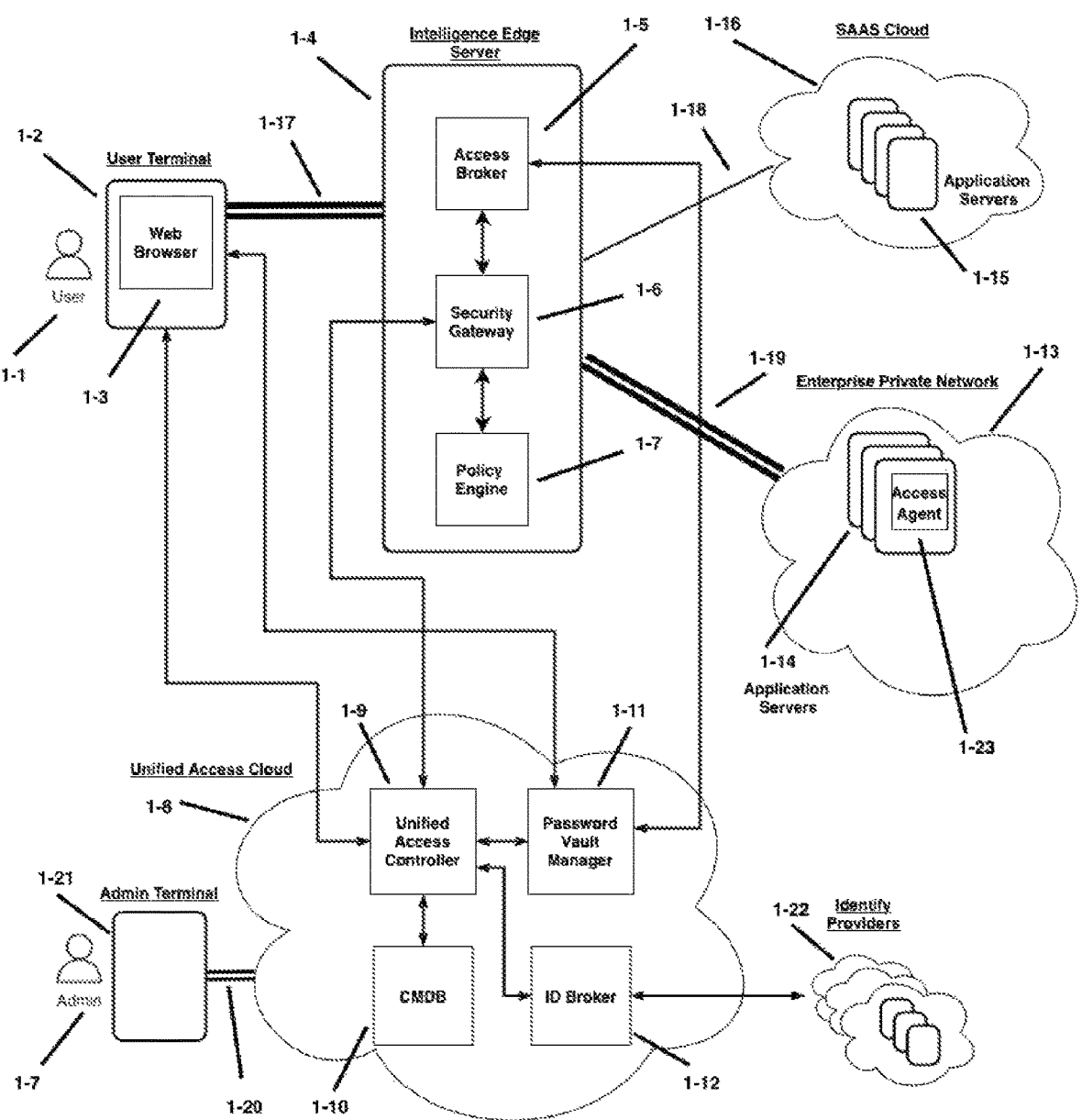
FIG. 1 is a block diagram that shows the key components of the embodiments of the invention, which includes Web Browser 1-3, Intelligence Edge Server 1-4, and Unified Access Cloud Controller 1-9. The diagram shows possible communication among components via Application Program Interface (API) calls by lines with arrows. The diagram also shows possible secure network connections by double lines.

In an embodiment, a unified secure access control solution is implemented to enable users to securely authenticate with applications hosted in SAAS cloud or private networks. FIG. 1 shows the key components of the embodiments of the invention.

Intelligence Edge Server 1-4: A software server providing software services for unified secure access control to applications hosted in SAAS cloud or private networks. Intelligence Edge Server 1-4 is deployed at a network edge close to users' geographical locations to ensure the control of users' secure access to software services and applications with minimized latency. Intelligence Edge Server 1-4 comprises the following key software services:

Access Broker 1-5: A software service that identifies the tokenized credentials in a user's authentication request and updates the login credentials accordingly for the user to access the SAAS or private application account. Access Broker 1-5 may also forward the user's authentication request with updated login credentials to an enterprise application server if requested by Access Agent 1-23 installed at the enterprise application server.

Policy Engine 1-7: A software service that makes access decisions on a user's access request based on the access policies, e.g. endpoint security posture policies, application access policies, network policies, etc., provisioned by IT administrators.

Security Gateway 1-6: A software service that controls a user's access by coordinating with Access Broker 1-5 and Policy Engine 1-7. Security Gateway 1-6 queries Policy Engine 1-7 to determine if the user is allowed to access the SAAS or private application. If access is allowed, Security Gateway 1-6 obtains the appropriate login credentials from Access Broker 1-5 and forwards the user's login request to the corresponding SAAS or private application.

Unified Access Cloud 1-8: A cloud infrastructure that hosts software applications and services for security access configuration and management. Unified Access Cloud 1-8 hosts the following key software applications and services:

Unified Access Controller 1-9: A software service that manages the Web Browser 1-3 including session admission control and session monitoring. Intelligence Edge Server 1-4 accepts the session request from Web Browser 1-3 or from a web browser thin client installed in User Terminal 1-2, and determines if the request is admitted by Unified Access Controller 1-9.

CMDB 1-10: Configuration Management Database (CMDB) that is used to keep track of the state of assets such as products, systems, software, applications, facilities, etc., and the relationship between all assets. A CMDB helps IT administrators understand the relationship between the components of a system and to track their configurations such security policies.

Password Vault Manager 1-11: A software service that stores users' credentials and context information. A user's login credentials to SAAS or private applications are all provisioned at Password Vault Manager 1-11 by IT administrators.

ID Broker 1-12: A software service that serves a proxy to external identity providers 1-12 in case that SSO is integrated with the applications that a user can access.

Web Browser 1-3: A web browser software application such as Safari and Chrome installed at a user terminal 1-2 that communicates via API calls with Unified Access Controller 1-9 hosted in Unified Access Cloud 1-8. In an embodiment, a Web Browser 1-3 is enhanced with a Unified Access Browser Extension, which enables the Web Browser 1-3 to interact with a user during the login process, for example, to identify login fields required, and communicate with Intelligence Edge Server 1-4 as well as Unified Access Cloud 1-8.

The user terminal 1-2 can be a mobile device such as a smartphone or a desktop computer such as a PC.

In an embodiment, an IT administrator provisions SAAS accounts as well as private enterprise application accounts for all the users in Unified Access Cloud 1-8. The SAAS accounts are associated with the applications running on applications servers 1-15 hosted in SAAS cloud 1-16. The private enterprise application accounts are associated with the applications running on applications servers 1-14 hosted in Enterprise Private Network 1-13.

An IT administrator 1-17 creates users in Unified Access Cloud 1-8 and assigns certain SAAS accounts or private enterprise application accounts to the users. In this case, a user will not obtain the actual SAAS or private enterprise application access account credentials. Password Vault Manager 1-11 in Unified Access Cloud 1-8 is used to manage these SAAS or private enterprise application accounts, e.g. user name, password, time-based one-time password, etc.

In an embodiment, a Web Browser 1-3 is installed on the user's User Terminal 1-2. The User Terminal 1-2 can be a mobile device such as a smartphone or a desktop computer such as a PC. The User Terminal 1-2 is connected to the Intelligence Edge Server 1-4 via a secure tunnel 1-17 all the time. Therefore, a user's access to any application is controlled by the Intelligence Edge Server 1-4, no matter whether the application is hosted on SAAS cloud 1-16 or Enterprise Private Network 1-13.

In an embodiment, when a user uses the Web Browser 1-3 installed at the user terminal 1-2 to access SAAS or private applications, the Web Browser 1-3 enhanced with a Unified Access Browser Extension intercepts the request. The Web Browser 1-3 communicates with Unified Access Controller 1-9 hosted in Unified Access Cloud to determine if the user has the access permission of the SAAS or private application as requested.

If the user has the access permission of the SAAS or private application, the Web Browser 1-3 will prompt the user to login or auto login, where the login credentials will be tokenized by the Web Browser 1-3.

In an embodiment, an end user does not know the login credentials for the SAAS cloud access. The auto fill and login function of Unified Access Browser Extension of the Web Browser 1-3 will auto fill the derived and tokenized SAAS login credentials for the user.

Similarly, a user does not know the login credentials for the private applications hosted in private networks. The auto fill and login function of Unified Access Browser Extension of the Web Browser 1-3 will auto fill the derived and tokenized login credentials for the user to access the private applications.

In an embodiment, the auto fill and login function of Unified Access Browser Extension of the Web Browser 1-3 is different from the built-in auto fill and login function of the Web Browser 1-3. A user has to select the auto filled login inputs generated by the Unified Access Browser Extension to send the access request to the Application Servers 1-15 hosted in the SAAS cloud 1-16 or the Application Servers 1-14 hosted in the Enterprise Private Networks 1-13.

The auto login reduces the burden of a user to manage different sets of login credentials as well as prevents the possible credential leaks.

After being admitted by Unified Access Controller 1-9, a user's login request will be forwarded from the Web Browser 1-3 to the Intelligence Edge Server 1-4 via a secure network connection 1-17. The software applications and services in Intelligence Edge Server 1-4 will then process and forward the user's login request over the Internet connection 1-18 to the application servers 1-15 in SAAS cloud 1-16 or over the secure network connection 1-19 to the application servers 1-14 in Enterprise Private Network 1-13.

Figure 2:
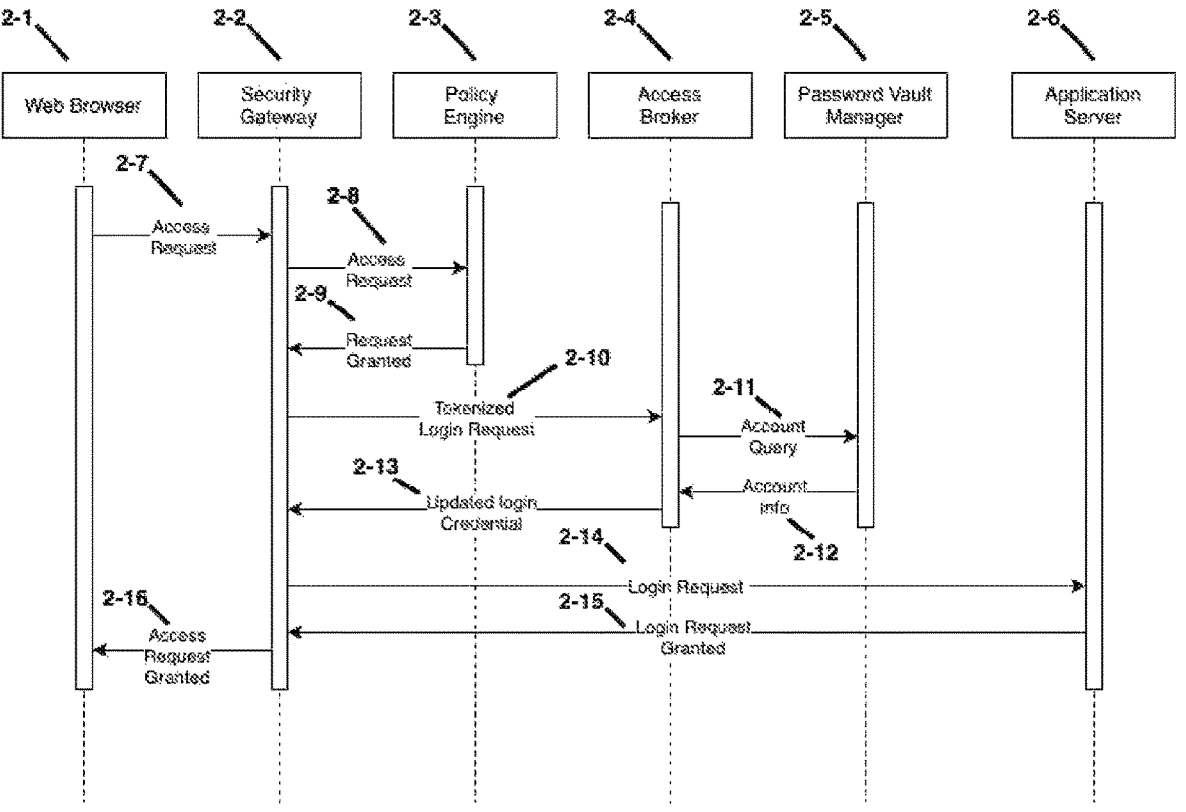
FIG. 2 is a diagram that shows an example process of granting a user's access request to an enterprise application, where Security Gateway 2-2 is able to intercept the user's access request. The access request is typically encapsulated in the payload of the Hypertext Transfer Protocol (HTTP). The access request may also be encapsulated in the payload of well-known Transport Layer Protocol (TCP) based client-server application protocols such as Remote Desktop Protocol (RDP), Secure SHell (SSH) and Virtual Network Computing (VNC).

In an embodiment, as shown in FIG. 2, Security Gateway 2-2 receives a user's access request 2-7 sent from Web Browser 2-1 and identifies this as an authentication request. The Security Gateway 2-2 queries Policy Engine 2-3 to make the access decision by forwarding the access request 2-8 to the Policy Engine 2-3.

In an embodiment, a Web Browser 2-1 is enhanced with a Unified Access Browser Extension, which enables the user interaction to identify the login fields to be replaced in the login authentication process from Access Request 2-7 to Access Request Granted 2-16.

The Policy Engine 2-3 evaluates if the user's access request should be granted or not based on the security policies set by IT administrators. The security policies can be based on the user's role with the enterprise, the location of the user terminal, the time when the user is allowed to access certain applications, if the endpoint is protected with antivirus software, if the endpoint disk is encrypted, etc. For example, a user with the role as an HR manager is allowed to access employee databases but only via the user terminals physically located at the Enterprise offices during weekdays.

If the user's access request 2-8 is granted, the Policy Engine 2-3 will reply with a request granted message to the Security Gateway 2-2. The Security Gateway 2-2 then passes the tokenized login request payload to Access Broker 2-4.

The Access Broker 2-4 first identifies the tokenized credential in the forwarded payload from the Security Gateway 2-2. Then, the Access Broker 2-4 queries Password Vault Manager 2-5 for the appropriate SAAS or private application account the user should be using. Next, the Access Broker 2-4 substitutes the tokenized info with the appropriate SAAS or private application account the user should be using. Next, the Access Broker 2-4 returns the updated login credential back to the Security Gateway 2-2.

In the case of SAAS access, once the Security Gateway 2-2 receives the updated login credential from the Access Broker 2-4, the Security Gateway 2-2 establishes a connection to the SAAS cloud over the Internet, and forwards the user's login request 2-14 to application server 2-6 hosted in the SAAS cloud. The application server 2-6 then grants the user's login request by sending back the login request granted message 2-15 to the Security Gateway 2-2. Finally, the Security Gateway 2-2 replies to the Web Browser 2-1 with the access request granted message 2-16.

If the user's login request is rejected by the application server, the Security Gateway 2-2 replies to the Web Browser 2-1 with an access request rejected message.

In the case of private application access, once the Security Gateway 2-2 receives the updated login credential from the Access Broker 2-4, the Security Gateway 2-2 gateway establishes a connection to the Enterprise Private Network over the secure network connection, and forwards the user's login request 2-14 to the application servers 2-6 hosted in the Enterprise Private Network. The application server 2-6 then grants the user's login request by sending back the login request granted message 2-15 to the Security Gateway 2-2. Next, the Security Gateway 2-2 replies to the Web Browser 2-1 with the access request granted message 2-16.

If the user's login request is rejected by the application server, the Security Gateway 2-2 replies to the Web Browser 2-1 with an access request rejected message.

Figure 3:
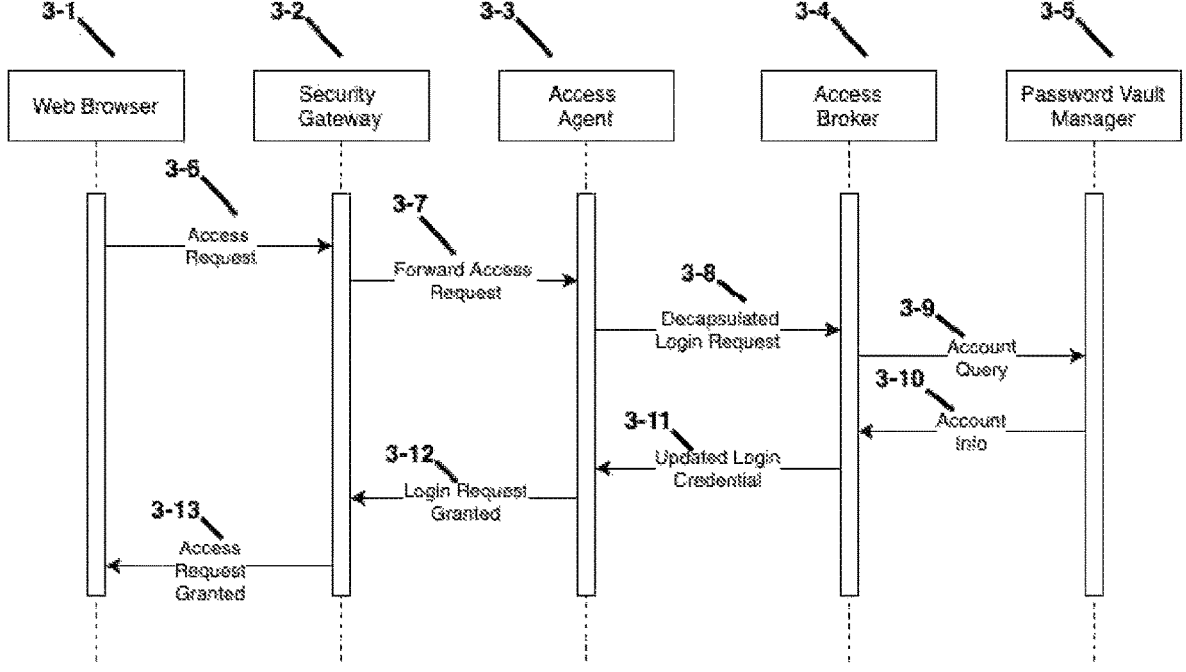
FIG. 3 is a diagram that shows an example process of granting a user's access request to an enterprise application, where Security Gateway 3-2 is not able to intercept the user's access request. The access request may be encapsulated in a proprietary protocol, e.g., a proprietary transport protocol, a proprietary application protocol carried by TCP, etc. In this case, the Security Gateway 3-2 is not able to intercept and decapsulate the access request, and it only provides a secure relay service, e.g., Zero Trust Network Access (ZTNA) service, by relaying the user's access request to the enterprise application for authentication.

In an embodiment, as shown in FIG. 3, Security Gateway 3-3 is not able to intercept the user's access request 3-6 from Web Browser 3-1 as the request may be encapsulated in a proprietary protocol.

In this case, the login request 3-7 from the user will be forwarded by the Security Gateway 3-2 to an Enterprise Application Server at an Enterprise Private Network, and is intercepted by an Access Agent 3-3 installed at the Enterprise Application Server. The Access Agent 3-3 extracts the login request from the user's request that may be encapsulated in a proprietary protocol, and then communicates with the Access Broker 3-4 by sending the decapsulated login request 3-8. Next, the Access Broker 3-4 queries Password Vault Manager 3-5 for the appropriate SAAS or private application account the user should be using. Then, the Access Broker 3-4 substitutes the tokenized info with the appropriate private application account the user should be using. Next, the Access Broker 3-4 returns the updated login credential back to the Access Agent 3-3 for login authentication. The Access Agent 3-3 grants the user's login request by sending the login request granted message 3-12 to the Security Gateway 3-2. Finally, the Security Gateway 3-2 replies to the Web Browser 3-1 by forwarding the access request granted message 3-13.

If the user's login request is rejected by the Access Agent 3-3, the Security Gateway 3-2 replies to the Web Browser 3-1 with an access request rejected message.

What is claimed is:

1. A method for providing access control to enterprise applications, the method comprising:

receiving, by an edge server intermediary to a plurality of clients and a plurality of enterprise application servers, a request from an access agent installed on an application server of the plurality of enterprise application servers, wherein the request is on behalf of a client of the plurality of clients to access an enterprise application hosted on the application server; determining by the edge server if the request is a login authentication request, wherein the login authentication request contains a tokenized login credential; in response to a determination that the request is a login authentication request, determining by the edge server if the client is allowed to access the enterprise application based on security policies; in response to a determination that the client is allowed to access the enterprise application based on the security policies, obtaining by the edge server a pre-configured login credential for the client to access the enterprise application, wherein the pre-configured login credential is provisioned for the client and stored in a password vault manager server; and forwarding the request by the edge server to the enterprise application after replacing the tokenized login credential in the request with the pre-configured login credential.

2. The method of claim 1, wherein the plurality of enterprise application servers are hosted in either SAAS cloud or private networks.

3. The method of claim 1, wherein the edge server is deployed at a network edge close to the geographical locations of the plurality of clients.

4. The method of claim 1, wherein the client is a web browser enhanced with an extension for access control to the enterprise application and derives the tokenized login credential through user interaction.

5. The method of claim 1, wherein the tokenized login credential substituted by the edge server with the pre-configured login credential is unknown to the client.

6. A system for providing access control to enterprise applications comprising:

one or more computers; and a computer-readable, non-transitory medium coupled to said one or more computers having instructions stored thereon which, when executed, cause the one or more computers to perform operations comprising:

receiving, by an edge server intermediary to a plurality of clients and a plurality of enterprise application servers, a request from an access agent installed on an application server of the plurality of enterprise application servers, wherein the request is on behalf of a client of the plurality of clients to access an enterprise application hosted on the application server; determining by the edge server if the request is a login authentication request, wherein the login authentication request contains a tokenized login credential;

in response to a determination that the request is a login authentication request, determining by the edge server if the client is allowed to access the enterprise application based on security policies; in response to a determination that the client is allowed to access the enterprise application based on the security policies, obtaining by the edge server a pre-configured login credential for the client to access the enterprise application, wherein the pre-configured login credential is provisioned for the client and stored in a password vault manager server; and forwarding the request by the edge server to the enterprise application after replacing the tokenized login credential in the request with the pre-configured login credential.

7. The system of claim 6, wherein the plurality of enterprise application servers are hosted in either SAAS cloud or private networks.

8. The system of claim 6, wherein the edge server is deployed at a network edge close to the geographical locations of the plurality of clients.

9. The system of claim 6, wherein the client is a web browser enhanced with an extension for access control to the enterprise application and derives the tokenized login credential through user interaction.

10. The system of claim 6, wherein the tokenized login credential substituted by the edge server with the pre-configured login credential is unknown to the client.

* * * * *